(12) United States Patent
Chen et al.

(10) Patent No.: US 10,839,009 B2
(45) Date of Patent: *Nov. 17, 2020

(54) SYSTEMS AND METHODS FOR ANALYZING TIME SERIES DATA BASED ON EVENT TRANSITIONS

(71) Applicant: Smiths Detection, LLC, Newark, CA (US)

(72) Inventors: Jixu Chen, Niskayuna, NY (US); Peter Henry Tu, Niskayuna, NY (US); Ming-Ching Chang, Clifton Park, NY (US); Yelin Kim, Ann Arbor, MI (US); Siwei Lyu, Albany, NY (US)

(73) Assignee: SMITHS DETECTION INC., Edgewood, MD (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/964,645

(22) Filed: Apr. 27, 2018

(65) Prior Publication Data

US 2018/0246963 A1    Aug. 30, 2018

Related U.S. Application Data

(63) Continuation of application No. 14/702,229, filed on May 1, 2015, now Pat. No. 9,984,154.

(51) Int. Cl.
*G06F 16/783* (2019.01)
(52) U.S. Cl.
CPC .................. *G06F 16/783* (2019.01)
(58) Field of Classification Search
CPC .................................................. G06F 16/783

USPC ........................................................ 707/740
See application file for complete search history.

(56) References Cited

U.S. PATENT DOCUMENTS

| | | | |
|---|---|---|---|
| 4,835,613 A | 5/1989 | Johnson | |
| 5,109,862 A | 5/1992 | Kelen et al. | |
| 5,412,769 A * | 5/1995 | Maruoka | G06F 17/18 345/440 |
| 6,004,270 A * | 12/1999 | Urbano | G01S 7/52034 600/440 |
| 6,137,283 A * | 10/2000 | Williams | G01R 23/16 324/121 R |
| 6,233,550 B1 | 5/2001 | Gersho et al. | |
| 7,735,104 B2 | 6/2010 | Dow et al. | |
| RE42,680 E | 9/2011 | Hilfiker et al. | |
| RE43,147 E | 1/2012 | Aviv | |
| RE44,225 E | 5/2013 | Aviv | |

(Continued)

OTHER PUBLICATIONS

Hoai et al., "Max-Margin Early Event Detection", 2012 IEEE Conference on Computer Vision and Pattern Recognition, Jun. 16-21, 2012, pp. 2863-2870. (Year: 2012).*

(Continued)

*Primary Examiner* — Phuong Thao Cao
(74) *Attorney, Agent, or Firm* — Armstrong Teasdale LLP

(57) ABSTRACT

A method for analyzing time series data to identify an event of interest is provided. The method includes receiving, at a computing device, time series data that includes the event of interest, identifying, using the computing device, a start time of the event of interest and an end time of the event of interest by modeling at least one transitional pattern in the time series data, and categorizing, using the computing device, the event of interest based on the at least one transitional pattern.

20 Claims, 9 Drawing Sheets

(56) References Cited

U.S. PATENT DOCUMENTS

| | | | |
|---|---|---|---|
| 8,478,048 B2 | 7/2013 | Ding et al. | |
| RE44,527 E | 10/2013 | Aviv | |
| 8,755,569 B2* | 6/2014 | Shen | G06K 9/00335 382/107 |
| 8,761,517 B2 | 6/2014 | Ding et al. | |
| 8,768,507 B2* | 7/2014 | Iba | B62D 57/032 700/245 |
| 8,824,863 B2 | 9/2014 | Kitamura et al. | |
| 8,892,491 B2 | 11/2014 | Wang et al. | |
| 8,898,058 B2 | 11/2014 | Shin et al. | |
| 9,043,329 B1* | 5/2015 | Patton | G06F 16/285 707/740 |
| 9,129,153 B2 | 9/2015 | Ianni et al. | |
| 9,165,567 B2 | 10/2015 | Visser et al. | |
| 9,230,159 B1* | 1/2016 | Vijayanarasimhan | G06K 9/3241 |
| 9,775,997 B2 | 10/2017 | Meister et al. | |
| 10,188,324 B2* | 1/2019 | Matsunaga | G06K 9/00342 |
| 2003/0058111 A1* | 3/2003 | Lee | G08B 21/0423 340/573.1 |
| 2003/0179204 A1 | 9/2003 | Mochizuki et al. | |
| 2004/0221311 A1 | 11/2004 | Dow et al. | |
| 2006/0218278 A1 | 9/2006 | Uyama et al. | |
| 2006/0230140 A1* | 10/2006 | Aoyama | G06N 3/08 709/224 |
| 2007/0028006 A1 | 2/2007 | Laefer et al. | |
| 2007/0079195 A1* | 4/2007 | Ueno | G06K 9/00496 714/731 |
| 2007/0291958 A1 | 12/2007 | Jehan | |
| 2008/0249859 A1* | 10/2008 | Angell | G06Q 30/02 705/14.39 |
| 2009/0281839 A1* | 11/2009 | Lynn | G16H 50/70 705/3 |
| 2010/0034462 A1* | 2/2010 | Nevatia | G06K 9/4642 382/190 |
| 2010/0303303 A1* | 12/2010 | Shen | G06K 9/00335 382/107 |
| 2011/0016363 A1 | 1/2011 | Washio | |
| 2011/0060709 A1* | 3/2011 | Ide | G01C 21/3484 706/12 |
| 2011/0137833 A1* | 6/2011 | Ide | G06N 7/005 706/12 |
| 2011/0185421 A1 | 7/2011 | Wittenstein et al. | |
| 2011/0214187 A1 | 9/2011 | Wittenstein et al. | |
| 2011/0302653 A1 | 12/2011 | Frantz et al. | |
| 2012/0002806 A1 | 1/2012 | Samari et al. | |
| 2012/0008819 A1 | 1/2012 | Ding et al. | |
| 2012/0008836 A1 | 1/2012 | Bobbitt et al. | |
| 2012/0087640 A1 | 4/2012 | Kitamura et al. | |
| 2012/0154684 A1* | 6/2012 | Luo | G11B 27/28 348/700 |
| 2012/0321146 A1 | 12/2012 | Kundu et al. | |
| 2012/0323836 A1 | 12/2012 | Wright et al. | |
| 2013/0082842 A1* | 4/2013 | Balazs | G08B 21/04 340/573.1 |
| 2013/0132316 A1 | 5/2013 | Wang et al. | |
| 2013/0138388 A1* | 5/2013 | Jain | G01P 15/00 702/141 |
| 2013/0170324 A1* | 7/2013 | Tu | G04G 21/08 368/28 |
| 2013/0266127 A1* | 10/2013 | Schachter | G10L 25/48 379/88.01 |
| 2013/0322215 A1 | 12/2013 | Du et al. | |
| 2014/0016860 A1 | 1/2014 | Senechal et al. | |
| 2014/0145936 A1* | 5/2014 | Gu | G06F 3/0304 345/156 |
| 2014/0247994 A1 | 9/2014 | Ding et al. | |
| 2014/0295313 A1 | 10/2014 | Reis et al. | |
| 2014/0317287 A1 | 10/2014 | Ziekow | |
| 2015/0135159 A1 | 5/2015 | Ezion et al. | |
| 2015/0186497 A1* | 7/2015 | Patton | G06F 16/285 707/740 |
| 2015/0251075 A1 | 9/2015 | Ianni et al. | |
| 2015/0258416 A1 | 9/2015 | Ianni et al. | |
| 2015/0269968 A1* | 9/2015 | Matejka | G11B 27/102 386/241 |
| 2015/0282766 A1* | 10/2015 | Cole | A61B 5/7267 702/139 |
| 2015/0288877 A1* | 10/2015 | Glazer | H04N 7/183 348/77 |
| 2016/0007912 A1* | 1/2016 | Hu | A61B 5/002 600/595 |
| 2016/0101285 A1 | 4/2016 | Meister et al. | |
| 2016/0101515 A1 | 4/2016 | Lim et al. | |
| 2016/0249833 A1* | 9/2016 | Ronchi | A61B 5/112 702/141 |
| 2016/0259794 A1 | 9/2016 | Hickman et al. | |
| 2016/0321257 A1 | 11/2016 | Chen et al. | |
| 2016/0371871 A1 | 12/2016 | Aguado | |

OTHER PUBLICATIONS

Rui et al., "Segmenting Visual Actions Based on Spatio-Temporal Motion Patterns", in Proceedings of IEEE Conference on Computer Vision and Pattern Recognition (CVPR 2000), Jan. 1, 2000, vol. 1, pp. 111-118. (Year: 2000).*

Turaga et al., "Machine Recognition of Human Activities: A Survey", IEEE Transactions on Circuits and Systems for Video Technology, vol. 18, No. 11, Nov. 2008, pp. 1473-1488. (Year: 2008).*

Wu et al., "Leveraging Hierarchical Parametric Networks for Skeletal Joints Based Action Segmentation and Recognition", Proceedings of the IEEE Conference on Computer Vision and Pattern Recognition, 2014, 8 pages. (Year: 2014).*

Zhang et al., "Fuzzy Segmentation and Recognition of Continuous Human Activities", 2014 IEEE International Conference on Robotics and Automation (ICRA), May 31-Jun. 7, 2014, pp. 6305-6312. (provided by Applicant) (Year: 2014).*

Jensen et al., "Exponential Sinusoidal Modeling of Transitional Speech Segments", In Proceedings of the 1999 IEEE International Conference on Acoustics, Speech, and Signal Processing, IEEE, Mar. 15-19, 1999, pp. 473-746. (Year: 1999).

Kim et al., "Modeling Transition Patterns Between Events for Temporal Human Actions Segmentation and Classification", In Proceedings of the 2015 11th IEEE International Conference and Workshops on Automatic Face and Gesture Recognition, May 4-8, 2015, IEEE, 8 pages. (Year: 2015).

Mori et al., "Behavior Prediction from Trajectories in a House by Estimating Transition Model Using Stay Points", 2011 IEEE/RSJ International Conference on Intelligent Robots and Systems, Sep. 25-30, 2011, San Francisco, CA, USA, pp. 3419-3425. (Year: 2011).

Zhang et al., "Fuzzy Segmentation and Recognition of Continuous Human Activities", 2014 IEEE International Conference on Robotics & Automation (ICRA), Hong Kong Convention and Exhibition Center, May 31-Jun. 7, 2014, Hong Kong, China, pp. 6305-6312. (Year: 2014).

* cited by examiner

Data: learned weight vector $w$, $testX$, $m_{tr}$, $std_{tr}$, $l_{min}$, $l_{max}$, number of classes $nCl$, $transMat$
Result: $f$, $bestL$, $bestY_{k-1}$
for each frame $u = l_{min} : len(X)$ do
    for each last segment label $y_k = 1:nCl$ do
        for $l = l_{min}:min(l_{max}, u-1)$ do
            Calculate $\eta(u, l, y) = w_y^T \varphi(X_{(u-l,u]})$, where $\varphi(X_{(u-l,u]})$ is z-standardized using $m_{tr}$ and $std_{tr}$.
        end
        for each second last segment label $y_{k-1} = 1:nCl$ do
            $f_{temp}(l, y_{k-1}) = f(u-l, y_{k-1}) + \eta(u, l, y_k) + \log P(y_k | y_{k-1})$
        end
        find $y_{k-1}^*$, $l^*$ that maximizes $f_{temp}(u, y_k)$.
        $f(u, y_k) = f_{temp}(l^*, y_{k-1}^*)$ $bestL(u, y_k) = l^*$
        $bestY_{k-1}(u, y_k) = y_{k-1}^*$
    end
end
Use $f$, $bestL$, $bestY_{k-1}$ for back-tracking

SYSTEMS AND METHODS FOR ANALYZING TIME SERIES DATA BASED ON EVENT TRANSITIONS

CROSS-REFERENCE TO RELATED APPLICATIONS

This application is a continuation application of U.S. Patent Application No. 14/702,229, filed May 1, 2015, issued as U.S. Pat. No. 9,984,154 on May 29, 2018, the entire contents of which are hereby incorporated herein by reference in their entirety.

BACKGROUND

The embodiments described herein relate generally to data analysis, and more particularly, to analyzing time series data by modeling transitional patterns between events.

In recent years, installations of large camera networks and wide availability of digital video cameras have generated large volumes of video data that may be processed and analyzed to retrieve useful information. As many videos involve human activity and behavior, a central task in video analytics is to effectively and efficiently extract complex and highly varying human-centric events from the videos. Event recognition processes are designed to achieve two goals: (i) localization of temporal segments in a video containing salient events (i.e., determining when something happened), and (ii) classification of the localized events into relevant categories (i.e., determining what happened). Further analysis may be conducted on the extracted events. For example, suspicious behavior in video surveillance may be identified.

At least some known video event analysis systems treat event localization and classification as separate problems. However, these two problems are interrelated. Specifically, better event localization improves subsequent classification, and reliable event classification may be used to achieve more precise localization. Methods for unifying localization and classification problems may be organized into two categories: (i) generative approaches that use dynamic Bayesian models (such as the hidden Markov model and switching linear dynamical systems), and (ii) discriminative approaches that use max margin classifiers.

At least some known video event analysis systems only consider monolithic or persistent events. For example, a system may focus on the identification of action states, such as walking or with arms folded. Such methods ignore regular transitional patterns that often occur between events of interest. For example, if a person starts with their arms positioned down in a resting position, and ends touching their nose, a transitional pattern occurs between, in which the arms move upward. Although an independent detection of such transitional patterns may be difficult using generative or discriminative approaches, the consecutive motion flow between action states is unique and recognizable, and may provide more reliable cues to localize and classify persistent events. However, at least some known video event analysis systems ignore or are unable to detect such transitional patterns.

BRIEF SUMMARY

In one aspect, a method for analyzing time series data to identify an event of interest is provided. The method includes receiving, at a computing device, time series data that includes the event of interest, identifying, using the computing device, a start time of the event of interest and an end time of the event of interest by modeling at least one transitional pattern in the time series data, and categorizing, using the computing device, the event of interest based on the at least one transitional pattern.

In another aspect, a computing device for analyzing time series data to identify an event of interest is provided. The computing device includes a memory device, and a processor communicatively coupled to the memory device. The processor is configured to receive time series data that includes the event of interest, identify a start time of the event of interest and an end time of the event of interest by modeling at least one transitional pattern in the time series data, and categorize the event of interest based on the at least one transitional pattern.

In yet another aspect, at least one non-transitory computer-readable storage media having computer-executable instructions embodied thereon is provided. When executed by at least one processor, the computer-executable instructions cause the processor to receive time series data that includes the event of interest, identify a start time of the event of interest and an end time of the event of interest by modeling at least one transitional pattern in the time series data, and categorize the event of interest based on the at least one transitional pattern.

BRIEF DESCRIPTION OF THE DRAWINGS

FIG. 3 is exemplary pseudo code of an algorithm for dynamic processing used with a transitional event model.

DETAILED DESCRIPTION

Figure 1:
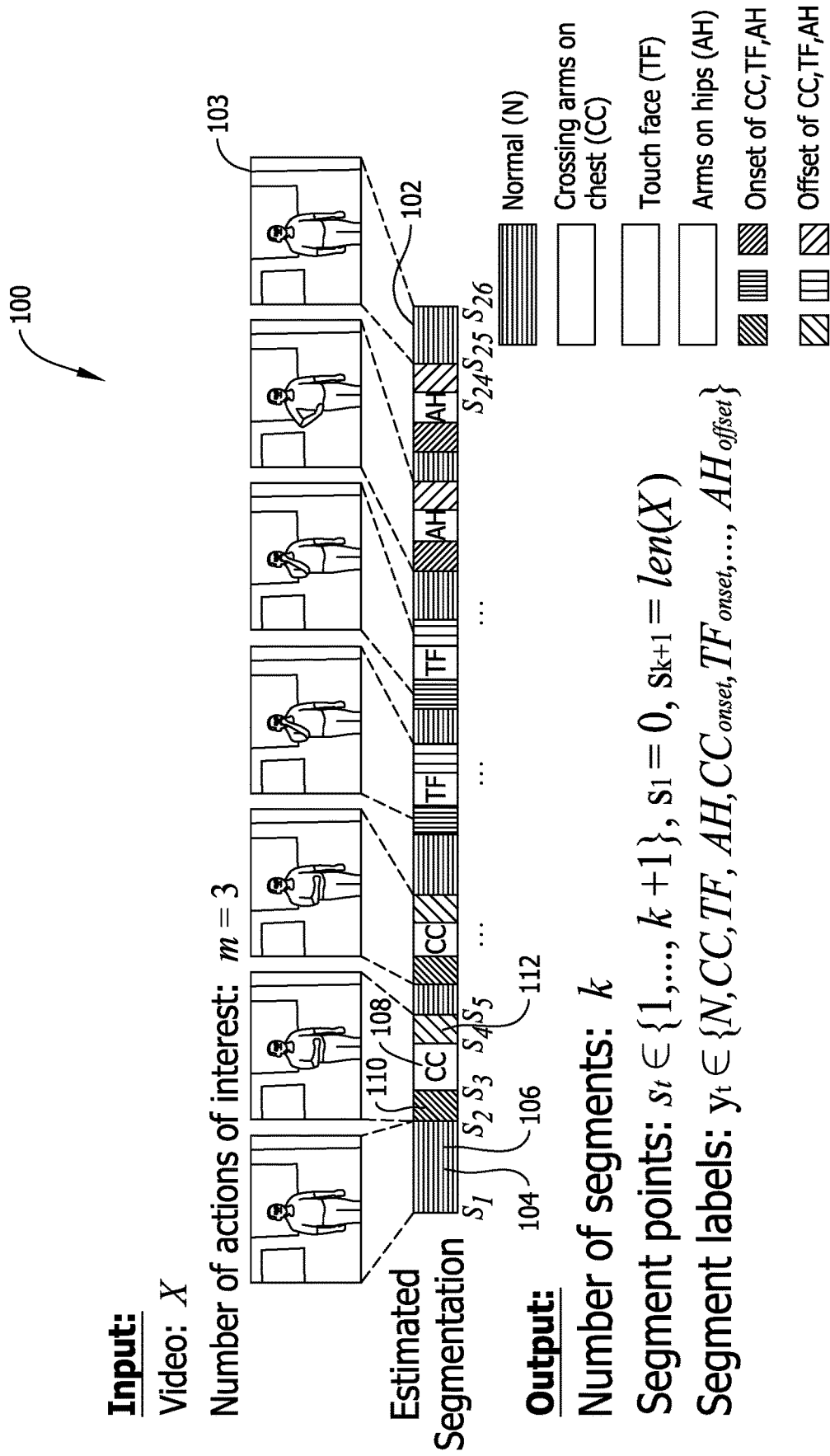
FIG. 1 is a diagram of an exemplary video analytics framework.

The systems and methods described herein facilitate jointly analyzing video events with precise temporal localization and classification by modeling arbitrary transitional patterns between events. Event recognition rates are improved by leveraging clearly identified event boundaries. By explicit modeling of event transition segments, the embodiments described herein combine two approaches: (i) large margin discriminative learning of distinct event patterns, and (ii) generative event-level transition probability models. Event location and classification may be performed using an efficient dynamic programming inference.

The embodiments described herein may be used with any time series data that includes transitional patterns between events, and are applicable to problems outside of video analytics. For human action recognition in particular, the use of transitional patterns may greatly improve performance. Because even the same action (e.g., a person touching their face) may be highly varied in both spatial and temporal domains, the associated transitional pattern may be more salient and robust. Accordingly, explicit consideration of transitional patterns increases robustness in human action recognition, and may provide important information for decision making.

The systems and methods described herein focus on human action recognition from video. More specifically, in the exemplary embodiment, per-frame human pose estimation cues (i.e., body joint coordinates) are evaluated as a time series signal. As described in detail herein, variable-length segment-level features are computed using statistical functions and linear regression coefficients (i.e., slope) of frame-level features for each segment. In a supervised training phase, labeled intervals of video events and their corresponding event types are used to train a discriminative model. This model is then used in a testing phase, in which for a given test video, optimal segmentation start and end points are inferred with corresponding event labels by searching for a highest pattern matching score and transitional probability with efficient dynamic programming. The systems and methods described herein demonstrate significant improvements in classification and localization on collected video data sets and public benchmark datasets, in comparison to known systems.

The embodiments described herein may be applied to general tasks of segmenting human actions with transitional patterns. The algorithms described herein model arbitrary transitions between actions (e.g., a person touching their face, crossing their arms, etc.), and transitions between actions and neutral states (e.g., a person standing with their hands down). Notably, any transitional event model may be applied based on the transitional characteristics of datasets. However, neutral states between events may be prevalent, and accordingly, it is desirable to model them effectively using the transitional event model described herein. The transitional event model is described herein with reference to segment transition probabilities. Further, a generic method for event finding, localization, and classification is also described herein. The generic method involves training a multi-class support vector machine (SVM) using peak and transition segments, as described herein, and the inference and labeling of putative temporal segments using the SVM and dynamic programming.

Transitional event models may be used to describe temporal characteristics present between events of interest. Because datasets may have prevalent neutral states between events, four types of segments are modeled in the exemplary embodiment: (i) neutral segments, (ii) peak segments, (iii) onset segments, and (iv) offset segments. Neutral segments are segments that describe no significant visual cues of any event of interest. Peak segments are segments that describe salient and consistent visual cues of any event of interest. Notably, the specific definitions of neutral and peak segments may be application dependent. For each event type, two types of event transition segments are defined based on the neutral and peak segments. Specifically, onset segments are segments that describe the transition from neutral to peak events, and offset segments are segments that describe the transition from peak events to neutral.

FIG. 1 is a diagram 100 illustrating an exemplary video analytics framework. As shown in FIG. 1, a video 102 including a time series of frames 103 can be broken into a plurality of segments 104. In the exemplary embodiment, as described above, segments 104 include neutral segments 106, peak segments 108, onset segments 110, and offset segments 112. Neutral segments 106 may include the person's hands positioned downward at the sides. Peak segments 108 may include, for example, the person's arms crossed on their chest, the person touching their face, or the person's arms on their hip. Onset and offset segments 110 and 112 are transitions between the neutral and peak segments 106 and 108. Alternatively, as noted above, segments 104 may have any definition suitable to the particular application.

Figure 2:
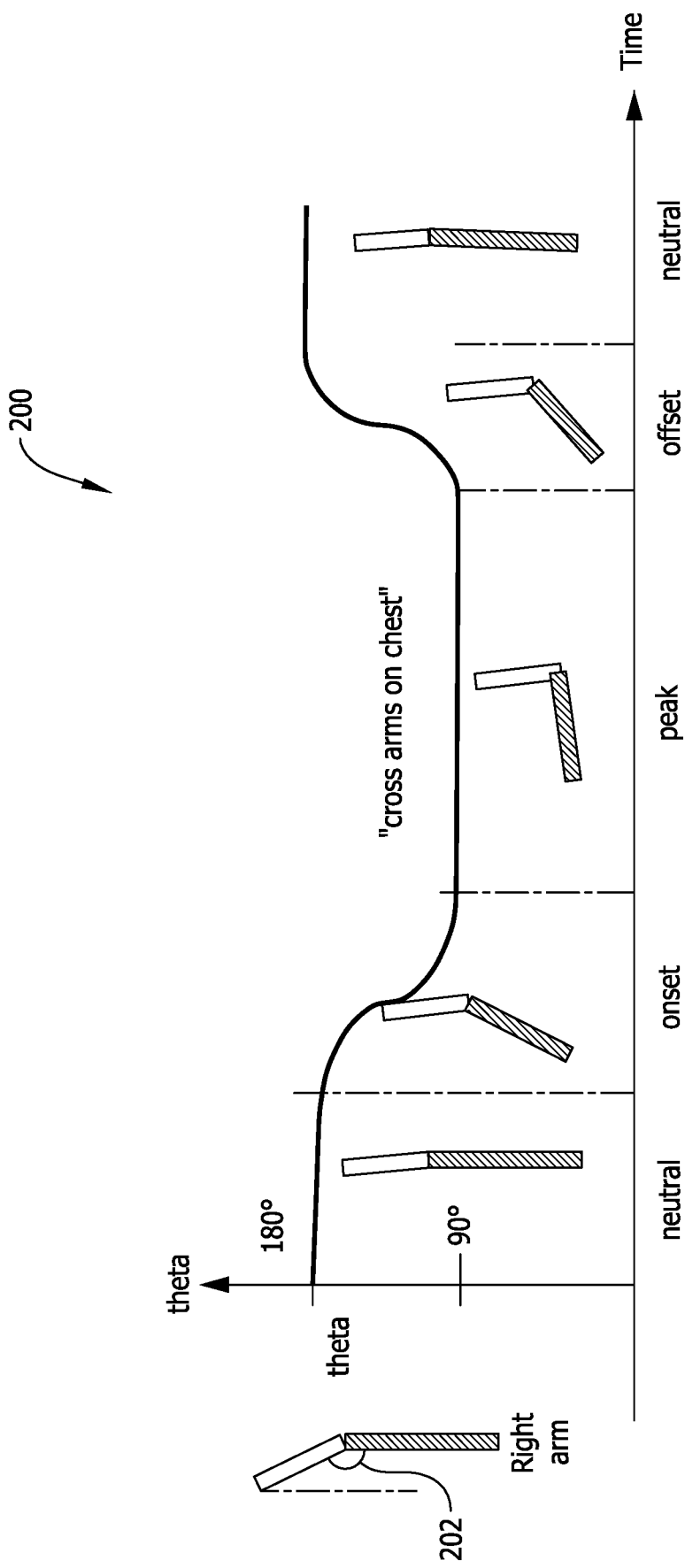
FIG. 2 is a graph illustrating neutral, onset, offset, and peak segments as a function of a join angle.

Segments 104 of no particular utility or interest may be modeled as neutral segments 106. Visual cues of onset segments 110 and offset segments 112 for the same peak segment 108 share commonalities. Accordingly, a repeating sequence of "neutral-onset-peak-offset-neutral" may be found in many event types of interest. For example, FIG. 2 is a graph 200 illustrating neutral, onset, offset, and peak segments as a function of a joint angle 202 for an action event corresponding to a person with their arms crossed on their chest. A relatively simple event model may be assumed that does not consider direct transitions between events without going through neutral events. This assumption effectively reduces the modeling of rarely occurring transitions, as supported by experimental results.

In the exemplary embodiment, temporal patterns between neutral, peak, onset, and offset segments are modeled using a transition probability matrix. An example of a transition probability matrix is shown in the following Table I. It models transitions between the neutral state and two events and their segments (i.e., peak, onset, and offset)

TABLE I

| From/To | Event1_Onset | Event1_Peak | Event1_Offset | Event2_Onset | Event2_Peak | Event2_Offset | Neutral |
| --- | --- | --- | --- | --- | --- | --- | --- |
| Event1_Onset | 0.03 | 0.91 | 0.03 | 0 | 0 | 0 | 0.03 |
| Event1_Peak | 0.03 | 0.03 | 0.91 | 0 | 0 | 0 | 0.03 |
| Event1_Offset | 0.03 | 0.03 | 0.03 | 0 | 0 | 0 | 0.91 |
| Event2_Onset | 0 | 0 | 0 | 0.03 | 0.91 | 0.03 | 0.03 |
| Event2_Peak | 0 | 0 | 0 | 0.03 | 0.03 | 0.91 | 0.03 |
| Event2_Offset | 0 | 0 | 0 | 0.03 | 0.03 | 0.03 | 0.91 |
| Neutral | 0.25 | 0 | 0 | 0.25 | 0 | 0 | 0.5 |

For example, following the observation of "neutral-onset-peak-offset-neutral" from training data, a transition probability from peak to offset, offset to normal, and onset to peak can be equally assigned as a default relatively high probability (e.g., 0.91). To model the transition from neutral states, two cases are modeled in the exemplary embodiment: (i) the changing to the onset state of one of two types of possible events is modeled with a transition probability P=0.25, or (ii) the event remains unchanged, which is modeled with a self-transition probability, $\gamma$. In one example, to facilitate maximizing a randomness of repeating the neutral event, $\gamma$ is set to 0.5.

Exemplary input and output notations of the systems and methods described herein are shown in FIG. 1. A multi-class (i.e., an M-class) SVM is training using event peak and transition segments (as opposed to neutral segments). In testing, for a given video, X, without any segmentation information, the following are found: a number of segments k, temporal start and end points of each segment $s_t$, $t \in 1, \ldots, k+1$, where $s_1=0$ and $s_{k+1}=\text{len}(X)$ (i.e., the length of X), and segment labels $y_t$, $\in 1, \ldots, k$. The exemplary method keeps track of the highest sums of SVM scores and the log transition probability of all segments.

Discriminative patterns of each peak and transition segment are learned using the multi-class SVM. Specifically, for each video sequence in the training data $X^i$, where $i \in \{1, 2, \ldots, n\}$, with known segments $t \in \{1, 2, \ldots, k_i\}$, where $k_i$ is the number of segments of the i-th video sequence, the following SVM is solved and $\omega^j$ is learned for inference:

$$\min_{w^j, \xi_t^i \geq 0} \frac{1}{2M} \sum_{j=1}^{M} \|w_j\|^2 + C \sum_{i=1}^{n} \sum_{t=1}^{k_i} \xi_t^i,$$

$$\text{s.t.} (w_{y_t^i} - w_y)^T \varphi(X^i_{(s_t^i, s_{(t+1)}^i]}) \geq 1 - \xi_t^i, \forall\, i, t, y \neq y_t^i.$$

Equation 1

In Equation 1, $$\varphi(X^i_{(s_t^i, s_{(t+1)}^i]})$$

is the segment-level feature of a segment $$X^i_{(s_t^i, s_{(t+1)}^i]},$$

consisting of frames from $s_t^i$ to $s_{(t+1)}^i$. The segment-level feature mapping is described in more detail below.

For each test video sequence X with unknown segment points and labels, in the exemplary embodiment, the sequence is segmented and classified using the following function that facilitates optimizing the sum of the total SVM scores and the log transition probability between consecutive segment pairs:

$$\max_{k, s_t, y_t} \sum_{t=1}^{k} w_{y_t}^T \varphi(x_t) + (1+\gamma) \log P(y_t | y_{t-1}), \text{ s.t.}$$

Equation 2

$$l_{min} \leq s_{t+1} - s_t \leq l_{max}, \forall\, t,$$

$$s_1 = 0, s_{k+1} = \text{len}(X),$$

The goal of Equation 2 is to facilitate maximizing the sum of segment-specific scores for each segmentation configuration (i.e., determine the number of total segments k, segment points $s_t$, and segment labels $y_t$, where $t \in \{1, 2, \ldots, k+1\}$) as well as the probability of transition from one segment to another. $l_{min}$ and $l_{max}$ are the minimum and maximum length of segments in the training data.

The relationship between temporally adjacent segments $(1+\gamma) \log P(y_t | y_{t-1})$ is calculated based on prior transition probabilities. Notably, as compared to at least some known methods, the log $P(y_t | y_{t-1})$ term explicitly considers event transitions in the optimization framework. Further, as compared to at least some known methods, non-maxima suppression-based segmentation is performed (as opposed to a maximum SVM score-based segmentation). That is, at least some known methods choose optimal segmentation that maximizes a different of SVM scores between the best and the second best class, filtering using the loss. In contrast, the embodiments described herein utilize a different approach by seeking an optimal segmentation that maximizes the sum of both (i) the SVM score of the segment class, and (ii) the transition probability between consecutive segments.

To solve Equation 2 efficiently, the following function $f$ is formulated to facilitate determining the best segmentation for a truncated time series $X_{(0,u]}$:

$$f(u, y_k) = \max_{k, s_t, y_t} \sum_{t=1}^{k} w_{y_t}^T \varphi(x_t) + (1+\gamma) \log P(y_t | y_{t-1})$$

Equation 3 where k is the number of segments for the truncated time series $X_{(0,u]}$. u can be considered as the increasing "front" of the dynamic programming (DP) formulation. Because the transition probability depends on the last segment's label can be considered as the increasing "front" of the dynamic programming (DP) formulation. Because the transition probability depends on the last segment's label $y_k$ of the truncated time series $X_{(0,u]}$, each $f$ value depends on u as well as $y_k$.

Therefore, for every tuple $u \in (0, \text{len}(X))$, $l \in [l_{min}, l_{max}]$ and class $y \in \{1, 2, \ldots, M\}$, $\eta(u, l, y) = w_y^T \varphi(X_{(u-l,u]})$ is calculated for inference, where $\eta$ is the SVM score of the segment $X_{(u-l,u]}$. Dynamic programming computes $\max_{y_k} f(\text{len}(X), y_k)$ efficiently using Equation 4:

$$f(u, y_k) =$$

$$\max_{l, y_{k-1}} f(u-l, y_{k-1}) + \eta(u, l, y_k) + (1+\gamma) \log P(y_k | y_{k-1})$$

Equation 4

FIG. 3 is exemplary pseudo code 300 of the algorithm for DP with the transitional event model. In pseudo code 300, w is a learned weight vector, testX and len(X) are a test video sequence and a number of frames of the test video sequence, $m_{tr}$ and $\text{std}_{tr}$ are the mean and standard deviation of each feature dimension in the training data for z-standardization, nCl is a number of classes, and transMat is a transition matrix to calculate $f$. The complexity of the algorithm may be represented as:

$$O(M^2 (l_{max} - l_{min} + 1)(\text{len}(X) - l_{min} + 1))$$

Equation 5

The methods and systems described herein were experimentally evaluated for joint segmentation and classification of video events using two datasets: (i) a smartroom dataset collected for real-life suspicious behavior recognition, and (ii) a Multi-Modal Action Detection MAD dataset. Both datasets contained a large variability of human poses and actions.

Figure 4:
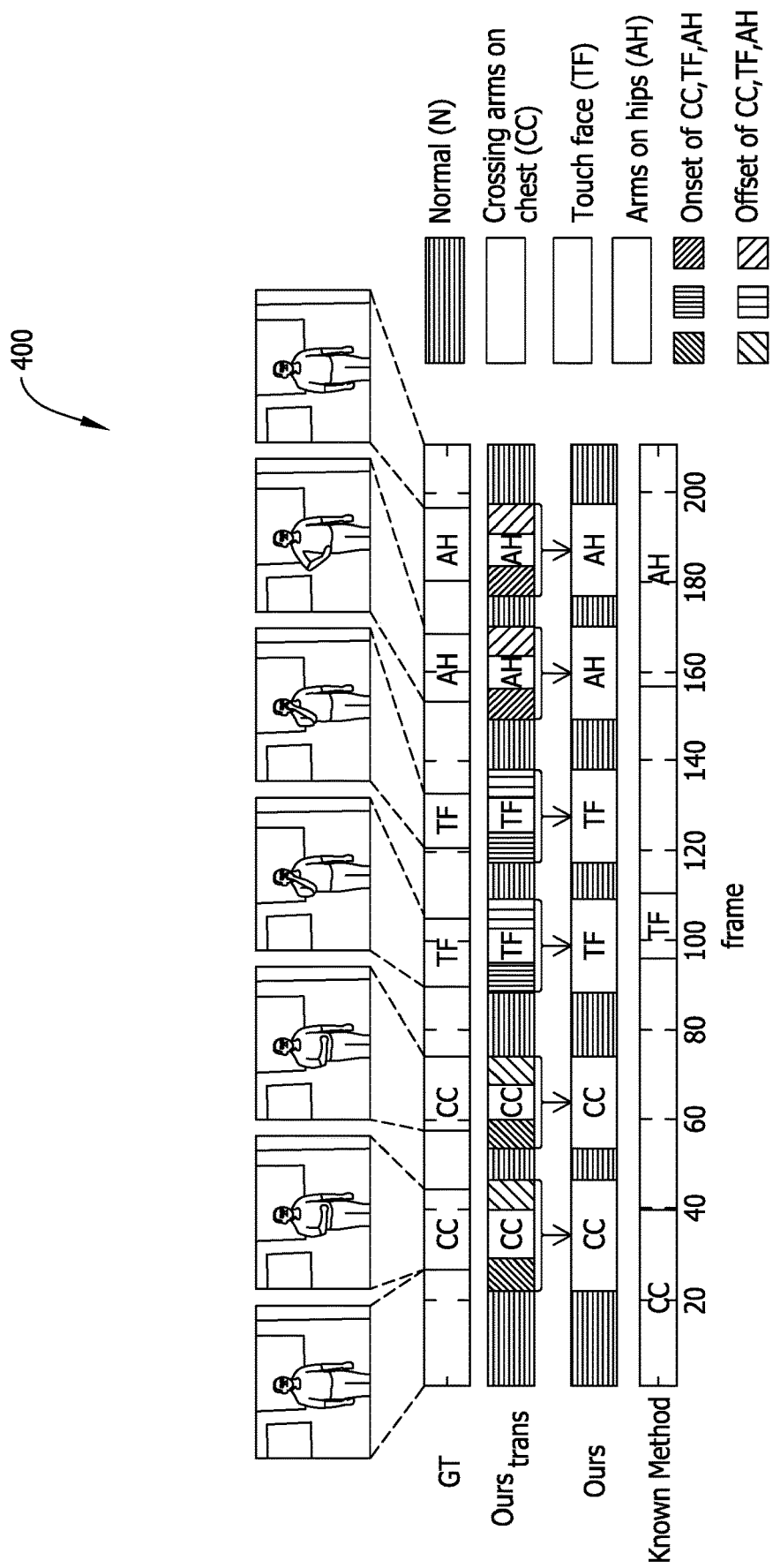
FIG. 4 is a diagram comparing systems and methods described herein with a known method.

The performance of the systems and methods described herein was experimentally compared with a known method that does not consider transition segments. For the comparison, the recognition rate was calculated after transferring the M action classes with transition segments, where M={m peak events}+{1 neutral events}+{m offset events}+{m onset events}, to m peak action classes. FIG. 4 is a diagram 400 comparing the systems and methods described herein to the known method that does not consider transition segments. Detected onset, offset, and peak segments of each action were combined into one action. For example, in the smartroom dataset, after back-tracking was completed and ten class labels were obtained for each detected segment, the onset, offset, and peak segments were combined into one action segment to match four class ground truth labels.

The performance of each algorithm can be expressed in terms of frame-level recognition rates and event-level recognition rates. Frame-level recognition rate measures the ratio of frames that are correctly classified. Frame-level precision ('Prec'), recall ('Rec'), and f-measure ('F-mea') are calculated. The accuracy is calculated as (TP+TN)/(TP+TN+FP+FN), where TP, TN, FP, and FN are true positive, true negative, false positive, and false negative, respectively.

In the exemplary embodiment, the measure of event-level recognition rate reflects the ratio of event segments that are corrected identified, by counting the number of correct frames that overlap with 50% of a segment. Event-level prevision, recall, and f-measure are evaluated. Event-level precision ('prec') computes the ratio between the number of correctly detected events and the number of detected events, and event-level recall ('rec') computes the ratio between the number of correctly detected events and the number of ground truth events. Event-level f-measure computes the balanced f-score using $$2 * \frac{prec * rec}{prec + rec}.$$

Figure 7:
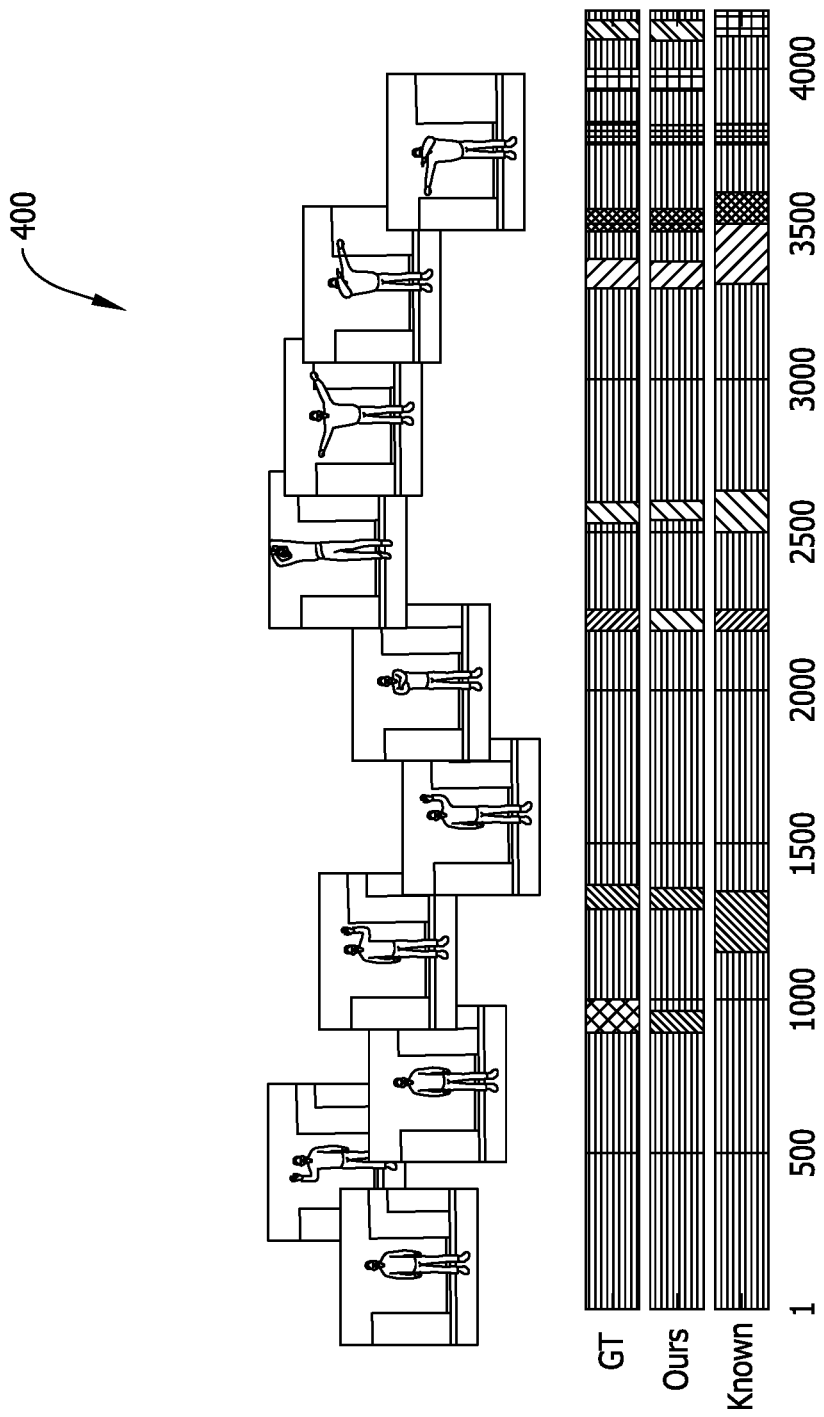
FIG. 7 is a diagram comparing systems and methods described herein with a known method.

In the datasets used, in which there are at most nine ground truth events, the event-level recognition rate was highly sensitive compared to the frame-level recognition rates. The start and event time of each event is manually labeled in the dataset in this embodiment. The manual labeling is used as the ground truth to evaluate the automatic event segmentation algorithm. FIGS. 4 and 7 show two examples of ground truth labeling.

The smartroom dataset was created with subjects performing a series of upper body actions, where both the temporal duration of events and the number of events were unknowns. The dataset contained six subjects performing a mix of the following actions in eight videos: cross arms on chest (CC), touch face (TF), arms on hip (AH), and normal (N). The repetition times of each action vary per video (with two to three repetitions of the same action). The normal action represents the case of a subject with their hands down in a resting position. The average length of the videos was 47.8 seconds. Each of the actions {CC, TF, AH} were enacted sequentially following the "neutral-onset-peak-offset-neutral" pattern for the right arm, left arm, and both arms. The events had a large variation in temporal durations and spatial locations.

Figure 5:
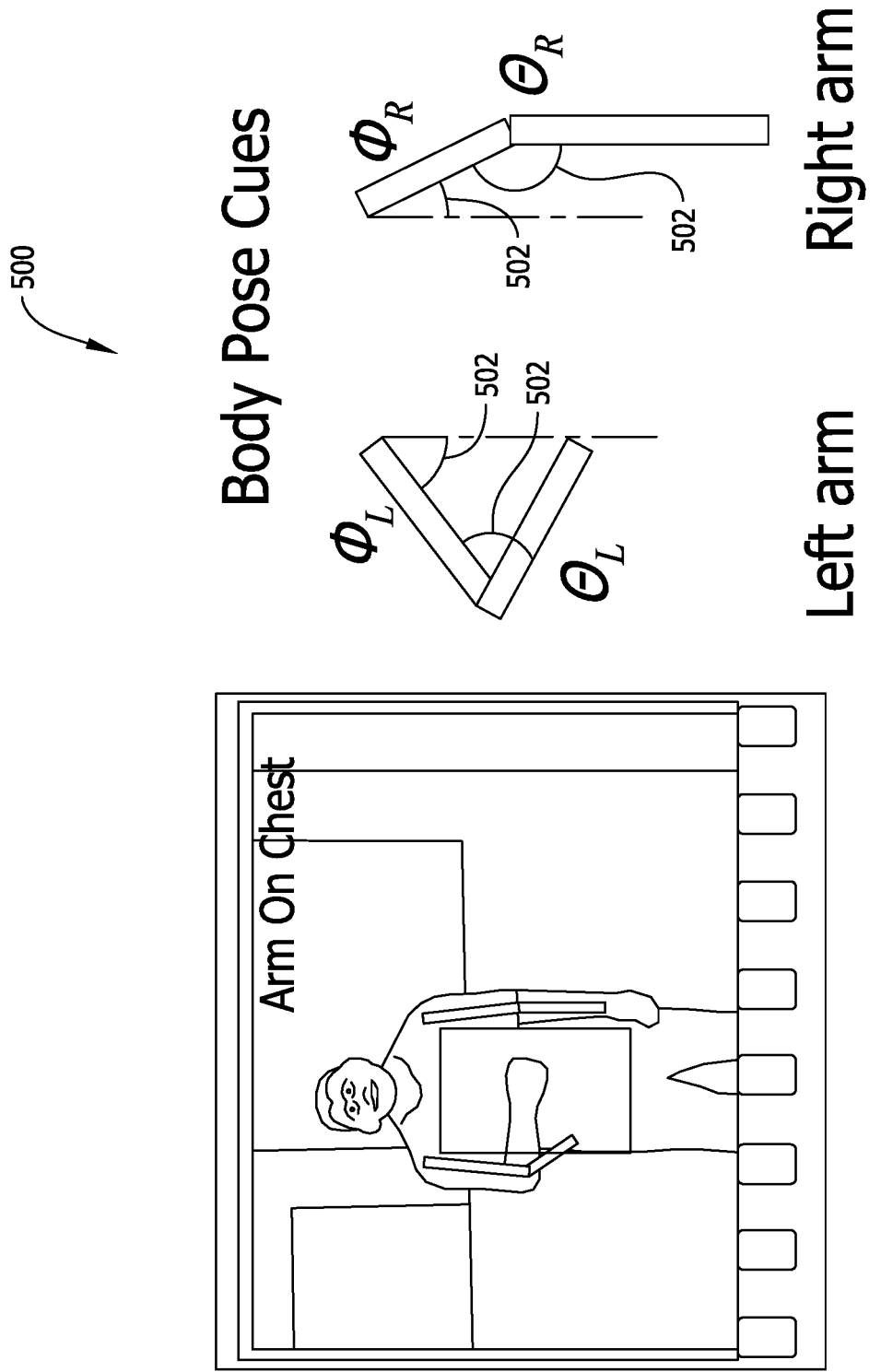
FIG. 5 is a diagram illustrating conversion of pose estimations into body joint angles.

A multimodal decomposable (MODEC) algorithm was used to estimate per-frame body pose cues to serve as action features, and a Kalman filter was employed to produce a smooth pose time series. Pose estimations from the images were converted into body joint angles as shown in diagram 500 of FIG. 5. Specifically, as shown in diagram 500, four joint angles 502 were estimated at the shoulders (between the torso and upper arms with angles $\phi_L$, $\phi_R$) and the elbows ($\theta_L$, $\theta_R$). The performance of MODEC pose estimation varies for different clothing and illumination conditions. The robustness of event recognition was evaluated upon such input variability.

Figure 6:
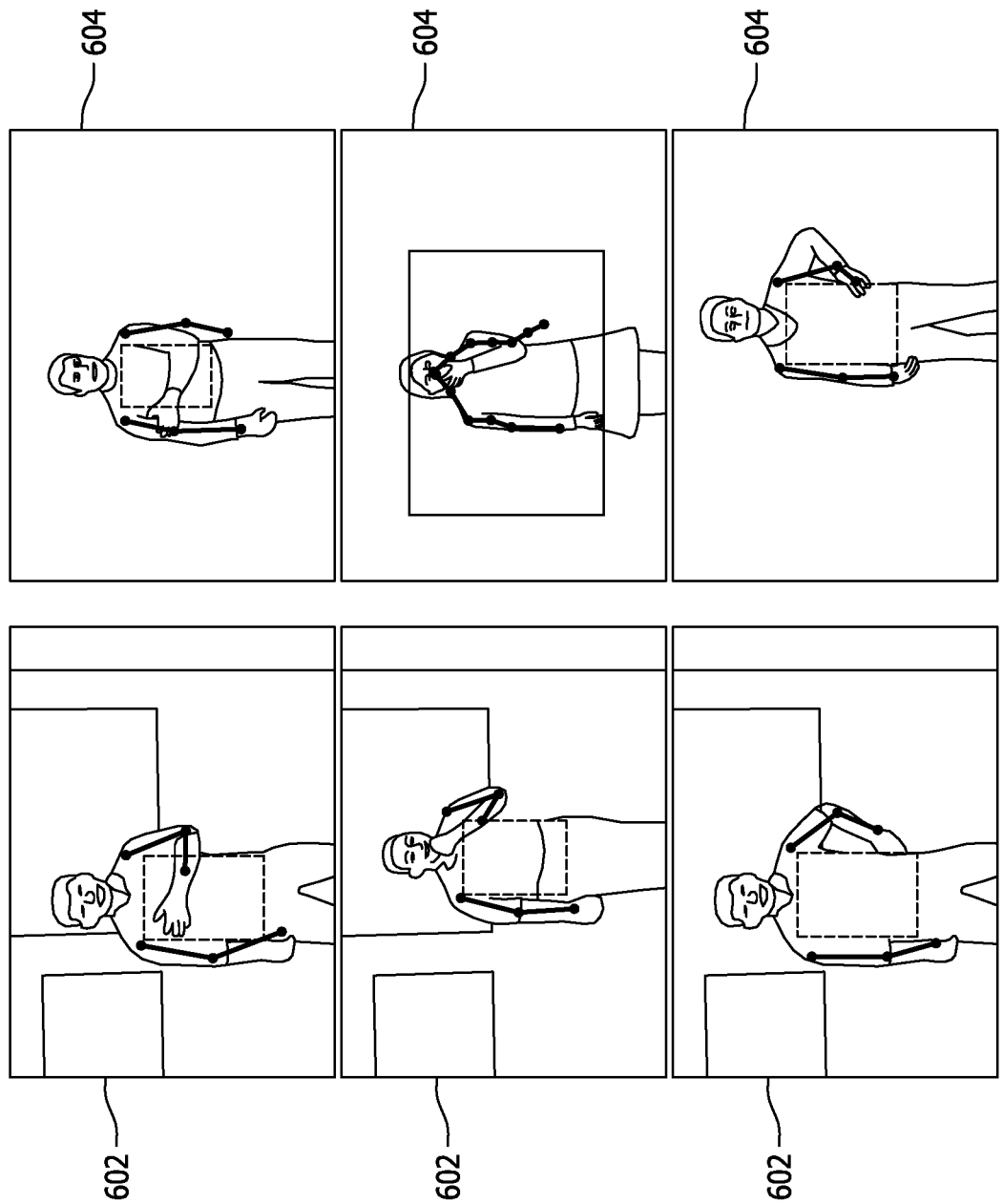
FIG. 6 is a plurality of exemplary images from a smart-room dataset.

Specifically, the smartroom dataset was divided into two subsets, and the systems and methods described herein were evaluated for each subset. The subset with more accurate pose estimation is referred to as the clean subset, and the subset with large pose estimation noise due to appearance and clothing variations is referred to as the noisy subset. The MODEC pose estimation comparisons of these two subsets are shown in FIG. 6. Specifically, first images 602 are from the clean subset, and second images 604 are from the noisy subset. Notably, due to the variation in clothing and illumination conditions, first images 602 show more accurate pose estimation than second images 604. Although three images 602, 604 are shown for each dataset, in the actual experimental comparison, the clean subset included three videos, and the noisy dataset included five videos.

For the comparison, two-types of segment level features φ were extracted for each video segment: (i) first and second-order statistics (e.g., mean and standard deviation) of the frame-level features, and (ii) a linear regression coefficient (i.e., slope) across frames within each segment, which captures the dynamics of the changes of the frames within the segment. z-standardization was performed to normalize the segment-level features as follows:

First, a mean $m_i$ and standard deviation $st_i$ of each feature dimension i in the training data was calculated, and the training data was normalized using the two statistics. Then, during the inference, the same mean $m_i$ and standard deviation $st_i$ of each feature dimension was used to normalize the test segments in the dynamic programming steps.

For ground truth segment configurations, a human annotator labeled both (i) the start and end timing of the peak segment, and (ii) the action label of the three predefined actions {CC, TF, AH}. Three frames before and after each peak boundary were added, and non-overlapping onset, peak, offset, and neutral segments were defined. In the exemplary embodiment, the onset and offset segments were set to be seven frames in length.

Leave-one-video-out cross validation was performed (i.e., to evaluate the algorithm on one video, the model is retrained using all other videos in the dataset). This evaluation was performed on every video in the dataset. Diagram 400 (shown in FIG. 4) shows the segmentation result comparison between ground truth ("GT"), using the methods and systems described herein ("Ours$_{trans}$" and "Ours"), and the known method ("Known Method"). "Ours$_{trans}$" shows the transition segments, while "Ours" shows the transition segments combined into a single action segment for comparison with the known method. Both methods determine the start and end points of actions, as well as label each action event. However, as demonstrated by diagram 400, the systems and methods described herein significantly outperform the known method in terms of both frame and event-level recognition rates.

Table II and Table III shows comparisons between the methods and systems described herein ("Ours") and the known method ("Known") for the clean smartroom subset and the noisy smartroom subset, respectively.

TABLE II

| | Frame-level | | | | | | Event-level | | | | | |
|---|---|---|---|---|---|---|---|---|---|---|---|---|
| | Prec | | Rec | | F-mea | | Prec | | Rec | | F-mea | |
| Method | Mean | Std | Mean | Std | Mean | Std | Mean | Std | Mean | Std | Mean | Std |
| Ours | 83.84 | 7.45 | 80.41 | 12.18 | 81.95 | 9.52 | 86.67 | 11.55 | 89.63 | 10.02 | 88.07 | 10.54 |
| Known | 56.19 | 5.32 | 60.50 | 7.98 | 58.15 | 5.74 | 71.11 | 7.70 | 67.41 | 12.24 | 68.32 | 3.86 |
| Diff | 27.65 | | 19.91 | | 23.79 | | 15.55 | | 22.22 | | 19.75 | |

TABLE III

| | Frame-level | | | | | | Event-level | | | | | |
|---|---|---|---|---|---|---|---|---|---|---|---|---|
| | Prec | | Rec | | F-mea | | Prec | | Rec | | F-mea | |
| Method | Mean | Std | Mean | Std | Mean | Std | Mean | Std | Mean | Std | Mean | Std |
| Ours | 44.41 | 18.85 | 40.38 | 18.20 | 41.33 | 17.09 | 25.36 | 16.30 | 54.45 | 15.91 | 33.51 | 17.93 |
| Known | 24.39 | 11.54 | 13.60 | 6.88 | 17.26 | 8.33 | 14.33 | 14.93 | 11.20 | 6.81 | 11.75 | 10.56 |
| Diff | 20.02 | | 26.78 | | 24.07 | | 11.03 | | 43.24 | | 21.76 | |

For the clean subset, the methods described herein have a frame-level precision of 83.84%, a recall of 80.41%, and an f-measure of 81.95%. Notably, the frame-level recognition rates are higher than the known method by 27.65%, 19.91%, and 23.79% in terms of precision, recall, and f-measure, respectively. Also, event-level precision, recall, and f-measure are 86.67%, 89.63%, and 88.07% under the methods described herein, corresponding to improvements of 15.55%, 22.22%, and 19.75% in terms of precision, recall, and f-measure, respectively.

As shown in Table III, the methods described herein also demonstrate improvement over the known method when pose estimation is noisy. This demonstrates that by modeling transition segments between actions, the systems and methods described herein robustly segment and classify each salient action of a subject.

As noted above, the systems and methods described herein were also tested on a MAD dataset. The MAD dataset included thirty-five human actions of twenty subjects recorded using a motion tracking sensor. Similar to the smartroom dataset, the joint angles of elbows and shoulders were used as frame-level features (see FIG. 5), and the same segment-level features $\varphi$ were used for mapping as in the smartroom dataset (i.e., mean, standard deviation, and linear regression). The start and end times of each action are provided in the MAD dataset. However, the timings are not directly used in the "neutral-onset-peak-offset-neutral" model, because the action between the start and end times includes all of the neutral, onset, peak, offset, and neutral segments. Due to the specific labeling scheme of the MAD dataset, it is reasonable to separate each labeled action segments into three subsequences: i) [0-33/3%] for onset, ii) [33.3-66.6%] for peak, and iii) [66.6-100%] for offset. The evaluation of nine actions that include meaningful transitions were focused on, and actions such as running (where the action peak as well as the onset and offset transitions are not clearly defined) were excluded. These selected nine actions included: left/right arm wave, left/right arm pointing upwards, cross arms on the chest, basketball shooting, and both arms pointing to both sides, the left side, and the right side.

Five-fold cross validation was performed over the twenty subjects and the event-level performance was measured. Specifically, twenty subjects were randomly divided into five folds. Each fold contains four subjects' videos, each with two video sequences, for a total of eight video sequences per fold. The model was trained using videos in the other four folds. Due to computational constraints, to facilitate solving for an optimal segment configuration that maximizes the sum of SVM scores and event transition probability, DP was used over sliding windows having a size of about five hundred frames and about 25% of the length of a video sequence.

FIG. 7 is a diagram 700 showing a comparison between the methods described herein ("Ours") and the known method ("Known"). The ground truth segmentation ("GT") is also shown. Table IV summarizes the results of the comparison.

TABLE IV

| | Frame-level | | | | | | Event-level | | | | | |
|---|---|---|---|---|---|---|---|---|---|---|---|---|
| | Prec | | Rec | | F-mea | | Prec | | Rec | | F-mea | |
| Method | Mean | Std | Mean | Std | Mean | Std | Mean | Std | Mean | Std | Mean | Std |
| Ours | 85.00 | 8.82 | 71.41 | 7.25 | 77.41 | 7.01 | 74.40 | 15.02 | 85.02 | 12.17 | 78.81 | 12.95 |
| Known | 73.79 | 9.62 | 70.57 | 9.96 | 71.87 | 8.70 | 73.45 | 15.84 | 83.88 | 13.06 | 77.85 | 14.23 |
| Diff | 11.21 | | 0.84 | | 5.54 | | 0.95 | | 1.14 | | 0.98 | |

As shown in Table IV, all of the frame-level recognition levels are higher when using the methods described herein instead of the known method. For event-level accuracy, event-level recall is higher using the methods described herein, but precision and f-measure are lower. The overall improvement in frame-level and event-level recognition rates using the methods described herein demonstrates that for actions of interest with distinguishable transitional patterns, the methods described herein effectively localize and classify the action segments.

Regarding the difference between the performance gains for the smartroom dataset and the MAD dataset, two points are noted. First, for the MAD dataset, the transition segments are shorter and less-frequent. Because an advantage of the systems and methods described herein is better modeling of transition states, the improvement on the MAD dataset is relatively marginal. This also explains the greater performance gain in the frame-level compared to the event-level accuracy for the MAD dataset. In comparison, the smartroom dataset includes more frequency and longer event transitions; hence the performance improves significantly due to better transition modeling.

Second, the visual features for the smartroom dataset, and the pose estimation features from red-green-blue (RGB) cameras without depth information, are more difficult to estimate and thus are noisier than those of the MAD dataset. Therefore, a better transition model results in a greater performance gain on the smartroom dataset, where the input features are noisier in nature.

Figure 8:
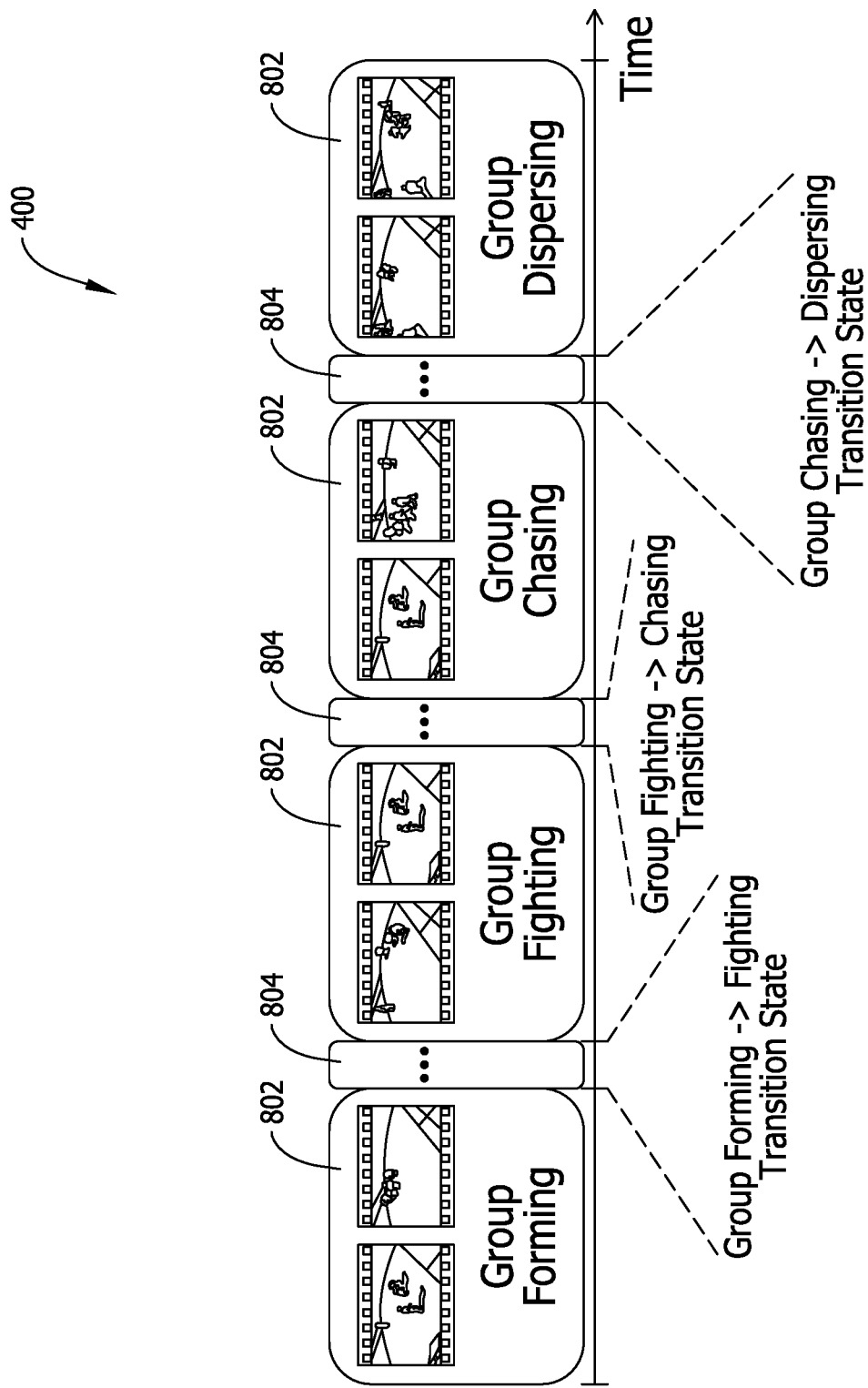
FIG. 8 is a diagram illustrating video analysis of group activity.

In the exemplary embodiments described above, actions performed by a single subject are analyzed. Alternatively, the systems and methods described herein may be used to analyze actions of a group of subjects. FIG. 8 is a diagram 800 illustrating analysis of group activity. Diagram 800 includes a number of action segments 802 and transition segments 804. Action segments 802 include a group forming, a group fighting, a group chasing, and a group dispersing. Transition segments 804 correspond to transitional patterns between action segments 802. Specifically, transition segments 804 include a transition between forming and fighting, a transition between fighting and chasing, and a transition between chasing and dispersing. Accordingly, those of skill in the art will appreciate that the systems and method described herein may be used in analyzing video data for both individual subjects and groups of subjects.

Figure 9:
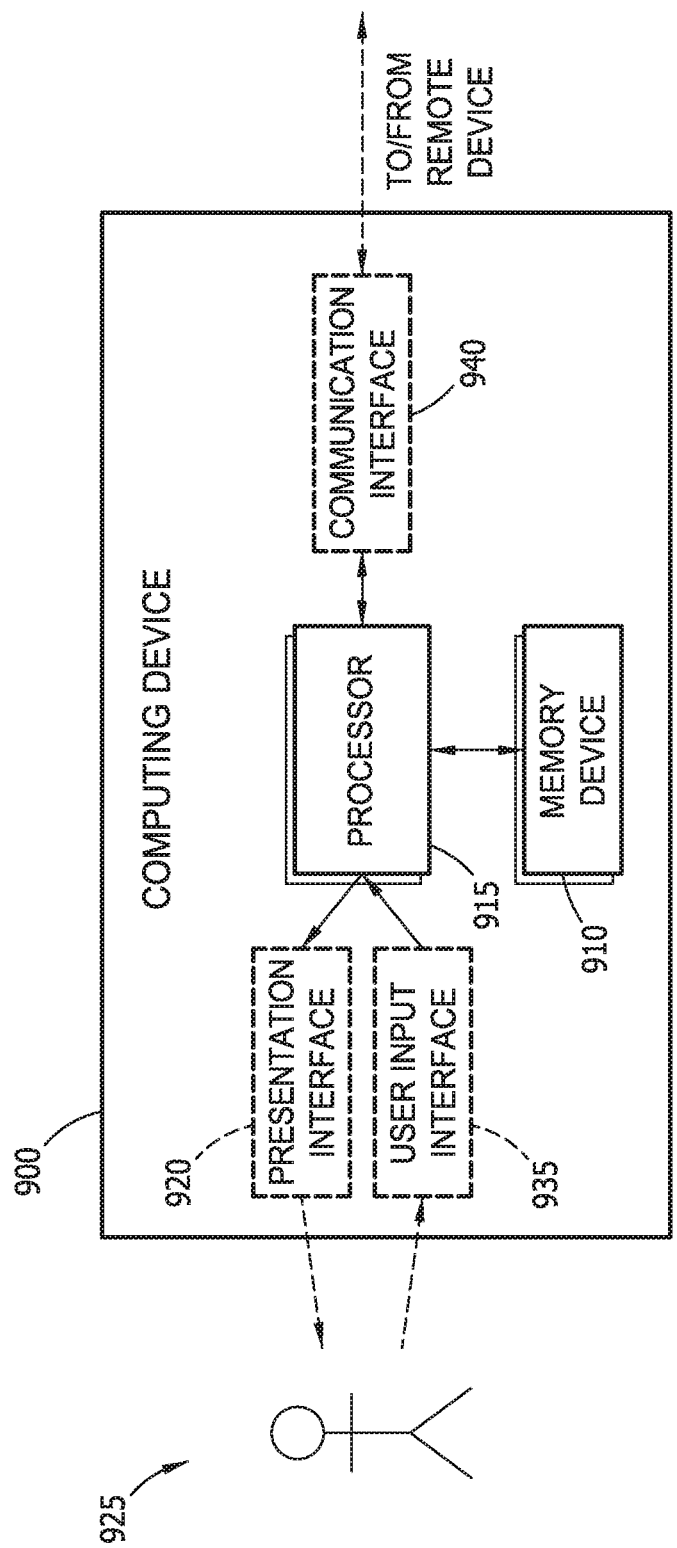
FIG. 9 is a block diagram of an exemplary computing device that may be used with the systems and methods described herein.

FIG. 9 is a block diagram of a computing device 900 that may be used to implement the video analysis systems and methods described herein. Computing device 900 includes at least one memory device 910 and a processor 915 that is coupled to memory device 910 for executing instructions. In some implementations, executable instructions are stored in memory device 910. In the exemplary implementation, computing device 900 performs one or more operations described herein by programming processor 915. For example, processor 915 may be programmed by encoding an operation as one or more executable instructions and by providing the executable instructions in memory device 910.

Processor 915 may include one or more processing units (e.g., in a multi-core configuration). Further, processor 915 may be implemented using one or more heterogeneous processor systems in which a main processor is present with secondary processors on a single chip. In another illustrative example, processor 915 may be a symmetric multi-processor system containing multiple processors of the same type. Further, processor 915 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), graphics processing units (GPU), and any other circuit capable of executing the functions described herein.

In the exemplary implementation, memory device 910 is one or more devices that enable information such as executable instructions and/or other data to be stored and retrieved. Memory device 910 may include one or more computer readable media, such as, without limitation, dynamic random access memory (DRAM), static random access memory (SRAM), a solid state disk, and/or a hard disk. Memory device 910 may be configured to store, without limitation, application source code, application object code, source code portions of interest, object code portions of interest, configuration data, execution events and/or any other type of data.

In the exemplary implementation, computing device 900 includes a presentation interface 920 that is coupled to processor 915. Presentation interface 920 presents information to a user 925. For example, presentation interface 920 may include a display adapter (not shown) that may be coupled to a display device, such as a cathode ray tube (CRT), a liquid crystal display (LCD), an organic LED (OLED) display, and/or an "electronic ink" display. In some implementations, presentation interface 920 includes one or more display devices. Presentation interface 920 may also generate and present one or more alerts (e.g., audio or visual alerts) to user 925. For example, if computing device 900 identifies suspicious behavior of one or more subjects in a video using the systems and methods described herein, presentation interface 920 may generate an appropriate alert.

In the exemplary implementation, computing device 900 includes a user input interface 935. User input interface 935 is coupled to processor 915 and receives input from user 925. User input interface 935 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 920 and user input interface 935.

Computing device 900, in the exemplary implementation, includes a communication interface 940 coupled to processor 915. Communication interface 940 communicates with one or more remote devices. To communicate with remote devices, communication interface 940 may include, for example, a wired network adapter, a wireless network adapter, and/or a mobile telecommunications adapter.

The systems and methods described herein provide a joint event localization and classification video analytics applications. Given a set of relatively long multi-dimensional time series data (e.g., a video), the systems and methods described herein utilize discriminative learning and efficient inference algorithms to jointly identify temporal segments of events and at the same time, recognize those events. The output of the embodiments described herein is twofold: (i) the identification of temporal start and end points of segments in a time series that contains one or more events, and (ii) simultaneous classification of corresponding event segments into known categories. The systems and methods described herein use information within event transition segments, or transitional patterns (i.e., segments between one event and another) to refine temporal boundaries between events and improve system-level performance and robustness.

The embodiments described herein explicitly represent event transition information in a time series sequence having multiple events. In video analytics, for example, a video may include multiple events of interest, where the localization and temporal extent of each event is unknown. Discovering events may be challenging. However, explicitly modeling events and the transitions between events facilitates identifying those events. An event transition, transition segment, or transitional pattern refers to a temporal segment in which one event starts to change to another event. For example, in video surveillance, events of interest may be a group fighting and chasing (see, e.g., FIG. 8), and the transition between such events is discriminative and can be utilized to identify the boundaries of the events. Further, in addition to explicitly modeling the features of the events, the event transition can also be modeled to boost performance.

In an exemplary video analytics application, frame-level visual descriptors may be extracted from a video. Segment-level features are then computed from the frame-level descriptors using a temporal bag-of-words. For example, in body behavior analysis, a temporal "word" may represent the action of "elbow joint angle decreasing" in one time frame. A "bag-of-words" which includes then "elbow joint angle decreasing" words may represent a continuous sequence of a subject raising their arm. In a training phase, patterns of event-specific segments are learned in a supervised manner. Specifically, start and end points of each event and corresponding labels are used to train a discriminative model. Unlike at least some known systems, a transition probability between events is utilized to refine segmentation boundaries and increase accuracy. For a given test video, the best segmentation start and end points are then inferred and labeled with corresponding event labels by searching for a highest pattern matching score using efficient dynamic programming.

Although the above embodiments discuss analyzing video data, other types of time series data may be analyzed using the systems and methods described herein. For video analytics, the embodiments described herein can automatically identify and recognize events in applications including video surveillance, summarization, content-based annotation, and smart environments. The same framework can also be applied to recognition and location of human poses for action recognition from videos. For healthcare operation monitoring systems, the systems and methods described herein may be used to identify whether salient procedural actions (e.g., washing hands, closing windows) were taken. This can improve the ability to evaluation healthcare providers, and provide alerts for better procedural executions. For capital applications, the embodiments described herein may be used to automatically detect abnormal transactions in financial time series data such as stock prices. Moreover, for aviation and energy applications, the systems and methods described herein can be applied to diagnostic applications, such as detecting potential malfunctions by analyzing time series data generated from turbine or engine sensors.

Given the growing quantity of time series data and videos, it is important to develop efficient algorithms for localizing and identifying salient temporal events in a large sequence. In particular, for a long video containing multiple events, it may be challenging to identify and classify individual events due to the high complexity and large variability in temporal and spatial pattern. These issues are addressed by the embodiments described herein using domain-specific discriminative features. Specifically, explicit modeling of event transitions provides greater capability and flexibility in automatic feature learning in order to localize events of interest.

The systems and methods described herein combine discriminative large margin classification with generative modeling. Explicit modeling of event transition segments, or transitional patterns, improves performance of joint localization and classification of video events. Further, the systems and methods described herein were experimentally compared to known methods, and demonstrate improved performance over known methods.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Technical effects of the systems and methods described herein include at least one of (a) receiving time series data that includes an event of interest; (b) identifying a start time of the event of interest and an end time of the event of interest by modeling at least one transitional pattern in the time series data; and (c) categorizing the event of interest based on the at least one transitional pattern.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for analyzing time series data to identify an event of interest, said method comprising:

receiving, at a computing device, image time series data that includes the event of interest, the event of interest corresponding to an action performed by a subject;

identifying, using the computing device, a start time of the event of interest and an end time of the event of interest by modeling at least one transitional pattern in the image time series data based on one or more estimated poses of the subject; and categorizing, using the computing device, the event of interest based on the at least one transitional pattern.

2. The method in accordance with claim 1, wherein the image time series data is video footage.

3. The method in accordance with claim 1, wherein the event of interest corresponds to an action performed by a single subject.

4. The method in accordance with claim 1, wherein the event of interest corresponds to an action performed by multiple subjects.

5. The method in accordance with claim 1, wherein modeling at least one transitional pattern comprises:

modeling an onset segment based on a first of the one or more estimated poses of the subject that represents a transition between a first neutral event and the event of interest; and modeling an offset segment based on a second of the one or more estimated poses of the subject that represents a transition between the event of interest and a second neutral event.

6. The method in accordance with claim 1, wherein identifying a start time of the event of interest and an end time of the event of interest comprises identifying the start and end times based on a probability that the event of interest will follow a first neutral event and that a second neutral event will follow the event of interest.

7. The method in accordance with claim 1, wherein categorizing the event of interest comprises categorizing the event of interest as corresponding to suspicious activity, the method further comprising generating an alert to notify a user that the event of interest corresponds to suspicious activity.

8. A computing device for analyzing time series data to identify an event of interest, the computing device comprising:

a memory device; and a processor communicatively coupled to said memory device, said processor configured to:

receive image time series data that includes the event of interest, the event of interest corresponding to an action performed by a subject;

identify a start time of the event of interest and an end time of the event of interest by modeling at least one transitional pattern in the image time series data based on one or more estimated poses of the subject; and categorize the event of interest based on the at least one transitional pattern.

9. The computing device in accordance with claim 8, wherein to receive image time series data, said processor is configured to receive video footage.

10. The computing device in accordance with claim 8, wherein to receive image time series data, said processor is configured to receive time series data that includes the action performed by a single subject.

11. The computing device in accordance with claim 8, wherein to receive image time series data, said processor is configured to receive time series data that includes the action performed by multiple subjects.

12. The computing device in accordance with claim 8, wherein to model at least one transitional pattern, said processor is configured to:

model an onset segment based on a first of the one or more estimated poses of the subject that represents a transition between a first neutral event and the event of interest; and model an offset segment based on a second of the one or more estimated poses of the subject that represents a transition between the event of interest and a second neutral event.

13. The computing device in accordance with claim 8, wherein to identify a start time of the event of interest and an end time of the event of interest, said processor is configured to identify the start and end times based on a probability that the event of interest will follow a first neutral event and a second neutral event will follow the event of interest.

14. The computing device in accordance with claim 8, wherein said processor is further configured to:

categorize the event of interest as corresponding to suspicious activity; and generate an alert to notify a user that the event of interest corresponds to suspicious activity.

15. At least one non-transitory computer-readable storage media having computer-executable instructions embodied thereon, wherein when executed by at least one processor, the computer-executable instructions cause the processor to:

receive image time series data that includes the event of interest, the event of interest corresponding to an action performed by a subject;

identify a start time of the event of interest and an end time of the event of interest by modeling at least one transitional pattern in the image time series data based on one or more estimated poses of the subject; and categorize the event of interest based on the at least one transitional pattern.

16. The at least one non-transitory computer-readable storage media in accordance with claim 15, wherein to receive image time series data, the computer-executable instructions cause the processor to receive video footage.

17. The at least one non-transitory computer-readable storage media in accordance with claim 15, wherein to receive image time series data, the computer-executable instructions cause the processor to receive image time series data that includes the action performed by a single subject.

18. The at least one non-transitory computer-readable storage media in accordance with claim 15, wherein to receive image time series data, the computer-executable instructions cause the processor to receive image time series data that includes the action performed by multiple subjects.

19. The at least one non-transitory computer-readable storage media in accordance with claim 15, wherein to model at least one transitional pattern, the computer-executable instructions cause the processor to:

model an onset segment based on a first of the one or more estimated poses of the subject that represents a transition between a first neutral event and the event of interest; and model an offset segment based on a second of the one or more estimated poses of the subject that represents a transition between the event of interest and a second neutral event.

20. The at least one non-transitory computer-readable storage media in accordance with claim 15, wherein to identify a start time of the event of interest and an end time of the event of interest, the computer-executable instructions cause the processor to identify the start and end times based on a probability that the event of interest will follow a first neutral event and a second neutral event will follow the event of interest.

* * * * *